United States Patent
Yamamoto et al.

(10) Patent No.: US 7,390,593 B2
(45) Date of Patent: Jun. 24, 2008

(54) FINE CARBON FIBER, METHOD FOR PRODUCING THE SAME AND USE THEREOF

(75) Inventors: Ryuji Yamamoto, Kanagawa (JP); Toshio Morita, Kanagawa (JP)

(73) Assignee: Showa Denko K.K., Tokyo (JP)

( * ) Notice: Subject to any disclaimer, the term of this patent is extended or adjusted under 35 U.S.C. 154(b) by 660 days.

(21) Appl. No.: 10/494,810

(22) PCT Filed: Nov. 6, 2002

(86) PCT No.: PCT/JP02/11561

§ 371 (c)(1), (2), (4) Date: May 6, 2004

(87) PCT Pub. No.: WO03/040445

PCT Pub. Date: May 15, 2003

(65) Prior Publication Data

US 2004/0258606 A1 Dec. 23, 2004

Related U.S. Application Data

(60) Provisional application No. 60/407,705, filed on Sep. 4, 2002.

(30) Foreign Application Priority Data

Nov. 7, 2001 (JP) ............................. 2001-341744

(51) Int. Cl.
*D01F 9/12* (2006.01)
*H01B 1/04* (2006.01)
*C01B 31/00* (2006.01)

(52) U.S. Cl. .................. 429/231.8; 252/502; 423/447.2; 423/447.3; 502/416; 524/495; 977/745; 977/843

(58) Field of Classification Search ............. 423/447.2, 423/447.3, 460, 447.1; 252/502; 429/231.8; 502/416; 977/745, 843; 524/495
See application file for complete search history.

(56) References Cited

U.S. PATENT DOCUMENTS

| 4,572,813 | A | | 2/1986 | Arakawa |
| 4,923,637 | A | | 5/1990 | Yagi et al. |
| 5,560,898 | A | * | 10/1996 | Uchida et al. ............... 423/461 |
| 5,830,566 | A | * | 11/1998 | Kimura et al. ............. 428/323 |
| 5,853,865 | A | | 12/1998 | McHugh et al. |
| 6,489,026 | B1 | * | 12/2002 | Nishimura et al. .......... 428/367 |
| 6,730,398 | B2 | * | 5/2004 | Morita et al. ............... 428/367 |
| 6,844,061 | B2 | * | 1/2005 | Morita et al. ............... 428/367 |
| 6,974,627 | B2 | * | 12/2005 | Morita et al. ............... 428/367 |
| 7,122,132 | B2 | * | 10/2006 | Morita et al. ............... 252/502 |
| 7,150,840 | B2 | | 12/2006 | Yamamoto et al. |
| 7,150,911 | B2 | * | 12/2006 | Morita et al. ............... 428/368 |

FOREIGN PATENT DOCUMENTS

| EP | 0 296 613 A2 | | 12/1988 |
| EP | 1 191 131 A1 | | 3/2002 |
| JP | 60-027700 A | | 2/1985 |
| JP | 63-282313 A | | 11/1988 |
| JP | 7-48111 A | | 2/1995 |
| JP | 2778434 B2 | | 5/1998 |
| JP | 11-322314 A | | 11/1999 |
| JP | 2001-200211 A | | 7/2001 |
| WO | WO00/58536 | * | 3/2000 |

OTHER PUBLICATIONS

Pierard et al., Production of short carbon nanotubes with open tips by ball milling, Feb. 16, 2001, Chemical Physics Letters, 335, 1-8.*
Patton R D et al.: "Vapor grown carbon fiber composites with epoxy and poly (phenylene sulfide) matrices" Composites Part A: Applied Science and Manufacturing, Elsevier Science Publishers B.V., Amsterdam, NL, vol. 30, No. 9, Sep. 1999 pp. 1081-1091, XP004171653 ISSN: 1359-835X.

\* cited by examiner

*Primary Examiner*—Wayne Langel
*Assistant Examiner*—James Fiorito
(74) *Attorney, Agent, or Firm*—Sughrue Mion, PLLC (57) ABSTRACT

A vapor grown fine carbon fiber, each fiber filament of the carbon fiber comprising, in its interior, a hollow space extending along the fiber filament, and having a multi-layer structure, an outer diameter of 2 to 500 nm, and an aspect ratio of 1 to 100, wherein the fiber filament comprises a cut portion on its surface along the hollow space, a production method therefor, and electrically conductive material, a secondary battery and a gas occlusion material using the carbon fiber. The fine carbon fiber of the present invention is excellent in properties such as occlusion of gases such as hydrogen and methane, smoothness, electrical conductivity and thermal conductivity, and also excellent in dispersability, wettability and adhesion with a matrix such as resin.

20 Claims, 3 Drawing Sheets

FINE CARBON FIBER, METHOD FOR PRODUCING THE SAME AND USE THEREOF

CROSS-REFERENCE TO RELATED APPLICATIONS

This is an application filed pursuant to 35 U.S.C. Section 111(a) with claiming the benefit of U.S. provisional application Ser. No. 60/407,705 filed Sep. 4, 2002 under the provision of 35 U.S.C. 111(b), pursuant to 35 U.S.C. Section 119(e)(1).

TECHNICAL FIELD

The present invention relates to fine carbon fiber which exhibits excellent adhesion to a matrix formed of, for example, resin, ceramic, or metal, which can be uniformly dispersed in the matrix, and which has a low aspect ratio (length of fiber/diameter of fiber); and to a method for producing the fine carbon fiber.

More particularly, the present invention relates to fine carbon fiber having a low aspect ratio and having, on its surface, a functional group capable of improving wettability to a matrix, the carbon fiber being produced through wet treatment of vapor grown carbon fiber; and to a method for producing the fine carbon fiber.

The present invention also relates to fine carbon fiber having a low aspect ratio, which is useful as a filler material for improving electrical conductivity and thermal conductivity, as an electron emission material for producing field emission displays (FEDs), as a medium for sorption of hydrogen, methane, or various other gasses, and as a material employed in, for example, transparent electrodes, electromagnetic wave shielding materials, and secondary batteries; and to a method for producing the fine carbon fiber.

The present invention also relates to a battery electrode containing the fine carbon fiber so as to attain improved charge/discharge capacity and exhibit improved strength, the battery electrode being employed as a positive or negative electrode of any of a variety of secondary batteries such as dry batteries, lead storage batteries, capacitors, and recently developed Li-ion secondary batteries.

BACKGROUND ART

Carbon fiber is used in a variety of composite materials, by virtue of its excellent properties such as high strength, high elastic modulus, and high electrical conductivity. In recent years, in conjunction with developments in electronic techniques, carbon fiber has been considered a promising electrically conductive filler for producing electromagnetic wave shielding materials or antistatic materials, and has been viewed as a useful antistatic filler which can be incorporated into resin or as a promising filler employed in transparent electrically conductive resin. Also, by virtue of its excellent tribological characteristics and high wear resistance, carbon fiber has been considered as a promising material which is applicable for use in, for example, electric brushes and variable resistors. In addition, carbon fiber has become of interest as a wiring material for producing devices such as LSIs, since it exhibits high electrical conductivity, high thermal conductivity, and electromigration resistance.

Conventional carbon fiber produced through carbonization of organic fiber by means of heat treatment in an inert atmosphere, such as polyacrylonitrile (PAN)-based carbon fiber, pitch-based carbon fiber, or cellulose carbon fiber, has a relatively large diameter; i.e., 5 to 10 μm, and exhibits poor electrical conductivity. Therefore, such carbon fiber has been widely employed as a reinforcement material in, for example, resin or ceramic.

In the 1980's, studies were conducted on a process for producing vapor grown carbon fiber through thermal decomposition of a gas of, for example, hydrocarbon in the presence of a transition metal catalyst. Through such a process, vapor grown carbon fiber having a diameter of about 0.1 to about 0.2 μm (about 100 to about 200 nm) and an aspect ratio of about 10 to about 500 has been produced. A variety of processes for producing vapor grown carbon fiber are disclosed, including a process in which an organic compound such as benzene, serving as a raw material, and an organo-transition metallic compound such as ferrocene, serving as a catalyst, are introduced into a high-temperature reaction furnace together with a carrier gas, to thereby produce vapor grown carbon fiber on a substrate (Japanese Patent Application Laid-Open (kokai) No. 60-27700); a process in which vapor grown carbon fiber is produced in a dispersed state (Japanese Patent Application Laid-Open (kokai) No. 60-54998, U.S. Pat. No. 4,572,813); and a process in which vapor grown carbon fiber is grown on a reaction furnace wall (Japanese Patent No. 2778434).

Since vapor grown carbon fiber is formed of carbon which is readily graphitized, when the carbon fiber is subjected to heat treatment at 2,000° C. or higher, the resultant carbon fiber exhibits excellent crystallinity and improved electrical conductivity. Therefore, the thus-graphitized carbon fiber is employed as an electrically conductive filler material in, for example, a resin or an electrode of a secondary battery.

A characteristic feature of each fiber filament of vapor grown carbon fiber resides in its shape and crystal structure. The fiber filament has a cylindrical structure including a very thin hollow space in its center portion, and a plurality of carbon hexagonal network layers grown around the hollow space so as to form annual-ring-like tubes. When vapor grown carbon fiber is subjected to heat treatment at 2,000° C. or higher, the cross section of each fiber filament of the thus-treated carbon fiber assumes a polygonal shape, and in some cases, micropores are formed in the interior of the fiber filament.

Since vapor grown carbon fiber has a small diameter, the carbon fiber has a relatively high aspect ratio. Generally, fiber filaments of the carbon fiber are entangled with one another to form fuzzball-like agglomerates.

Since vapor grown carbon fiber contains thermally decomposed carbon layers, the carbon fiber has a smooth surface. When such vapor grown carbon fiber is thermally treated at 2,000° C. or higher in an inert atmosphere, the thus-treated carbon fiber exhibits high crystallinity, and smoothness of its surface is further enhanced. The carbon fiber which has undergone heat treatment at high temperature has virtually no functional groups on its surface.

Since fiber filaments of vapor grown carbon fiber are entangled with one another to form agglomerates like fuzz-balls, when the carbon fiber is mixed with a matrix formed of, for example, resin or ceramic, the carbon fiber fails to be uniformly dispersed in the matrix, and thus electrical, thermal, and mechanical characteristics of interest cannot be obtained.

When such carbon fiber having a high aspect ratio is mixed with a resin so as to form a composite material, and the surface of the composite material is observed under a scanning electron microscope, the surface of the composite material is found to be not smooth but "hairy" with pieces of the carbon fiber not covered with resin. When the composite material is employed as an antistatic material for producing, for example, an integrated circuit (IC) tray, due to generation of microscratches at a point at which the tray is in contact with a disk or wafer, or deposition of impurities caused by falling of the carbon fiber, the quality of the disk or wafer is lowered, and the yield of a final product is reduced.

When carbon fiber exhibits insufficient wettability and affinity to a matrix formed of, for example, resin, adhesion between the carbon fiber and the matrix is lowered. Therefore, mechanical strength of the resultant composite material is lowered, falling of the carbon fiber occurs, and the quality of the composite material is deteriorated.

In view of the above problems, various attempts have been made to reduce the length of long carbon fiber through grinding, in order to improve dispersibility of the carbon fiber and to obtain a composite material of smooth surface in relation to the use as a filler. Conventionally, carbon fiber has been ground through dry grinding by use of, for example, a ball mill, to thereby form short carbon fiber (Japanese Patent Application Laid-Open (kokai) No. 1-65144, U.S. Pat. No. 4,923,637 and Japanese Patent Application Laid-Open (kokai) No.11-322314). However, grinding of carbon fiber through impact grinding by use of, for example, a ball mill or a roll mill involves the following problems. Although entangled fiber filaments of the carbon fiber are fragmented through such grinding, fine carbon fiber fragments generated through grinding form agglomerates in a mill or the fragments are bonded together when grinding reaches a certain degree. Therefore, micronization of the carbon fiber does not proceed further, even if grinding is performed for a long period of time. In addition, the resultant carbon fiber fragments have a length as large as about some μm.

DISCLOSURE OF INVENTION

An object of the present invention is to provide fine carbon fiber having a diameter of 500 nm or less and an aspect ratio of 100 or less, exhibiting excellent tribological characteristics, electrical conductivity, and thermal conductivity, and exhibiting excellent dispersibility in a matrix formed of, for example, resin, and excellent wettability and adhesion to the matrix.

Generally, in order to improve adhesion between carbon fiber and a matrix, carbon fiber having a reduced diameter is used to increase the contact area between the carbon fiber and the matrix, and in order to improve wettability or adhesion of carbon fiber to a resin serving as a matrix, the carbon fiber is subjected to oxidation, or a functional group is introduced on the surface of the carbon fiber. With a view to the above-mentioned problems, the present inventors have made intensive studies and have found that when fine carbon fiber having a high aspect ratio in which fiber filaments are entangled with one another is subjected to wet grinding, agglomerates formed of the filaments can be fragmented within a short period of time, and fine carbon fiber having an aspect ratio of interest can be produced; that a functional group is present on the surface of cut portion (the point of rupture) of the thus-ground fine carbon fiber, and presence of the functional group improves adhesion between the carbon fiber and a matrix formed of, for example, resin; and that the amount and type of the functional group present on the surface of the carbon fiber can be regulated by varying the type of a surfactant or an organic solvent employed when a slurry is formed from the fine carbon fiber.

According to the present invention, a fine carbon fiber having a low aspect ratio, which can be uniformly dispersed in a matrix formed of, for example, resin, ceramic, or metal, to thereby improve smoothness of the surface of the resultant composite material, which has a functional group on its surface, and which exhibits excellent adhesion to a matrix, can be easily produced through grinding.

Accordingly, the present invention relates to the following fine carbon fiber, production method therefor and use thereof.

1) A vapor grown fine carbon fiber, each fiber filament of the carbon fiber comprising, in its interior, a hollow space extending along the fiber filament, and having a multi-layer structure, an outer diameter of 2 to 500 nm, and an aspect ratio of 1 to 100, wherein the fiber filament comprises a cut portion on its surface along the hollow space;

2) The fine carbon fiber according to 1) above, wherein the cut portion on the surface of the fiber filament comprises a minute depression;

3) The fine carbon fiber according to 2) above, wherein the minute depression is in communication with the hollow space in the interior of the fiber filament;

4) The fine carbon fiber according to any one of 1) through 3) above, wherein the fiber filament has a functional group on a surface thereof;

5) The fine carbon fiber according to 4) above, wherein the functional group is at least one species selected from the group consisting of a hydroxyl group, a phenolic hydroxyl group, a carboxyl group, an amino group, a quinonyl group, and a lactone group;

6) The fine carbon fiber according to any one of 1) through 5) above, wherein the hollow space is partially closed;

7) The fine carbon fiber according to any one of 1) through 6) above, wherein the carbon fiber comprises carbon having an average interlayer distance $d_{002}$ of (002) carbon layers measured by X-ray diffraction method is 0.342 nm or less;

8) The fine carbon fiber according to any one of 1) through 6) above, which further comprises boron or a boron compound;

9) The fine carbon fiber according to 8) above, wherein boron is contained, in an amount of 0.01 to 5 mass %, in carbon crystals constituting the carbon fiber;

10) A fine carbon fiber mixture comprising a fine carbon fiber as recited in any one of 1) through 9) above in an amount of 5 mass % to 80 mass % on the basis of the entirety of the carbon fiber mixture;

11) A method for producing a fine carbon fiber, comprising a step of wet-grinding vapor grown carbon fiber containing branched vapor grown carbon fiber in the presence of water and/or an organic solvent, each fiber filament of the carbon fiber comprising, in its interior, a hollow space extending along the fiber-filament, and having a multi-layer structure, an outer diameter of 2 to 500 nm, and an aspect ratio of at least 10;

12) The method for producing a fine carbon fiber according to 11) above, wherein the wet-grinding is performed in the presence of a surfactant;

13) The method for producing a fine carbon fiber according to 11) above, comprising, before the step of wet-grinding, a step of adding or not adding boron or a boron compound to the vapor grown carbon fiber and then subjecting to heat treatment at a temperature of 2,000° C. to 3,500° C.;

14) The method for producing a fine carbon fiber according to 11) above, comprising, after the step of wet-grinding, a step of adding or not adding boron or a boron compound to the wet-ground fine carbon fiber and then subjecting to heat treatment at a temperature of 2,000° C. to 3,500° C.;

15) A fine carbon fiber produced through a production method as recited in any one of 11) through 14) above;

16) A fine carbon fiber composition comprising a fine carbon fiber produced through a production method as recited in any one of 1) through 9) and 15) above:

17) The fine carbon fiber composition according to 16) above, comprising a resin;

18) An electrically conductive material comprising a fine carbon fiber as recited in any one of 1) through 9) and 15) above;

19) A secondary battery comprising, as an electrode material, a fine carbon fiber as recited in any one of 1) through 9) and 15) above; and 20) A gas occlusion material comprising a fine carbon fiber as recited in any one of 1) through 9) and 15) above.

The low-aspect-ratio fine carbon fiber of the present invention is a conventionally unknown low-aspect-ratio fine carbon fiber having minute depressions and functional groups on the surface, which has been worked out as a result of extensive studies on grinding conditions for vapor grown fine carbon fiber in order to obtain a carbon fiber exhibiting excellent adhesion and affinity to resin, and excellent dispersibility in resin.

The low-aspect-ratio fine carbon fiber of the present invention is preferably employed as a transparent electrode filler or an occlusion material for gases such as hydrogen and methane, but use of the carbon fiber is not limited thereto, and the carbon fiber may also be employed as an electromagnetic wave shielding material, as a material for imparting electrical conductivity to, for example, a secondary battery, or as a thermally conductive filler. The carbon fiber may also be employed as a material for imparting electrical conductivity to the surface of, for example, an OPC drum or a printed circuit board.

DETAILED DESCRIPTION OF INVENTION

The fine carbon fiber of the present invention will next be described.

The fine carbon fiber of the present invention is a fine carbon fiber produced through a vapor growth process. Each fiber filament of the carbon fiber includes a hollow space in its interior, and has a multi-layer structure (annual-ring-like-tube structure), an outer diameter of 2 to 500 nm, preferably 2 to 200 nm, and an aspect ratio of 1 to 100, preferably 3 to 20, wherein the fiber filament has a cut portion on at least a portion of its surface. The cut portion is produced through, for example, rupture in grinding of carbon fiber, and the cut portion exhibits high reactivity at its surface by virtue of functional groups included therein. At the cut portion, carbon atoms at the edged sites of detects of the basal plane and carbon atoms at the edged sites of boundaries between crystallites are exposed.

The fine carbon fiber of the present invention is produced through the following procedure: vapor grown carbon fiber containing branched vapor grown carbon fiber is dispersed in, for example, water and/or an organic solvent, and if desired, a surfactant is added to the resultant mixture; and the mixture is subjected to wet grinding.

The thus-ground carbon fiber is dried to thereby produce fine carbon fiber. Each fiber filament of the carbon fiber has, on its surface along the fiber axial direction, merely a cut portion or both a cut portion and a minute depression. In addition, the fiber filament has, on its surface, a functional group containing oxygen, such as a hydroxyl group, a phenolic hydroxyl group, a carboxyl group, a quinonyl group, or a lactone group; an amino group; or a amido group. The fine carbon fiber having such a functional group exhibits improved affinity to, for example, resin, since the functional group contains oxygen or nitrogen.

Each branched fiber filament of vapor grown carbon fiber used in the present invention contains a hollow space extending throughout the filament, though some portions of the hollow space are closed. When the carbon fiber containing hollow filament with some branches, wherein the branched portions of the hollow space are in communication with one another, is subjected to grinding, ruptures occur in the vicinity of branch points of filaments. As a result, minute depressions are formed on the surface of the fiber filament, and each depression comes into communication with the hollow space of the fiber filament. Therefore, the resultant carbon fiber exhibits improved wettability and adhesion to, for example, resin.

Moreover, by grinding carbon fiber which contains hollow spaces with some closed portions, as compared with a carbon fiber with no closed portions, the surface area of filament does not increase too much after grinding and the wettability with resin is enhanced. Furthermore, the surface of ruptured point becomes irregular with small concavities and convexities to improve adhesion to resin.

The amount and type of the functional group present on the surface of the fine carbon fiber of the present invention can be regulated by varying the type of a surfactant, the type of an organic solvent, and drying temperature (i.e., temperature at which the functional group is removed). Thus, wettability and adhesion of the fine carbon fiber to resin can be improved.

Hereinafter, a preferred method for producing the fine carbon fiber of the present invention will be described.

The fine carbon fiber of the present invention can be obtained by wet-grinding a vapor grown fine carbon fiber, each fiber filament of the carbon fiber comprising, in its interior, a hollow space extending along the fiber filament, and having a multi-layer structure, an outer diameter of 2 to 500 nm and an aspect ratio of at least 10, and containing branched vapor grown fine carbon fiber, in the presence of water and/or an organic solvent.

The carbon fiber employed in the method is generally produced through thermal decomposition of an organic compound in the presence of an organo-transition metallic compound.

Examples of the organic compound which may serve as a raw material of the carbon fiber include gases such as toluene, benzene, naphthalene, ethylene, acetylene, and ethane, natural gas and carbon monoxide, and mixtures thereof. Of these, aromatic hydrocarbons such as toluene and benzene are preferred.

An organo-transition metallic compound contains a transition metal having a catalytic activity. Transition metal is a metal belonging to Group IVa, Va, VIIa, VIIa, or VIII (Group 4 to Group 10) of the periodic table. An organo-transition metallic compound such as ferrocene or nickelocene is preferred.

The carbon fiber is produced through the following procedure: the aforementioned organic compound and organo-transition metallic compound are gasified, the thus-gasified compounds are mixed with a reducing gas (e.g., hydrogen) which has been heated to 500 to 1,300° C., and the resultant mixture gas is fed to a reaction furnace heated to 800 to 1,300° C., to thereby allow reaction to proceed.

The material for carbon fiber to be subjected to grinding is preferably treated at 900 to 1,300° C. in advance to the grinding step, in order to remove an organic substance (e.g., tar) deposited onto the surface of the carbon fiber material produced through thermal decomposition.

For wet-grinding, fine carbon fiber is dispersed in water containing a surfactant and/or an organic solvent. The concentration of the fine carbon fiber is within a range of 1 to 30 mass %, preferably 3 to 20 mass %, more preferably 5 to 15 mass %. If the concentration is less than 1 mass %, grinding efficiency is low. If the concentration exceeds 30 mass %, the carbon fiber is not well dispersed in the solvent, and due to high viscosity of the resultant slurry, fluidity and grinding efficiency are lowered.

Examples of surfactants which may be employed include anionic surfactants, cationic surfactants, nonionic surfactants, and amphoteric surfactants. Nonionic surfactants, anionic surfactants, and cationic surfactants are preferred. Specific examples include polyethylene glycol alkyl phenyl ethers such as Triton (Trademark), sulfate salts of polyethylene glycol alkyl phenyl ethers, and benzalconium chloride. The amount of a surfactant added to the carbon fiber is 0.01 to 50 mass %, preferably 0.1 to 30 mass %, on the basis of the entirety of the carbon fiber.

Examples of organic solvents which may be employed include alcohols such as methanol, ethanol, n-butanol, n-propanol, and n-hexanol; chain hydrocarbons such as n-decane, n-pentane, n-hexane, and n-heptane; aromatic hydrocarbons such as benzene, toluene, and xylene; ketones such as acetone and methyl ethyl ketone; ethers such as diethyl ether and dibutyl ether; and esters such as ethyl acetate and butyl acetate.

Any known grinding apparatus employing shearing force, compression force, or friction force, such as a rotatable cylindrical mill, a vibration ball mill, a planetary ball mill, a medium stirring mill, or a colloid mill, may be employed.

A mixture containing the thus-ground carbon fiber is subjected to filtration and washing, to thereby remove a solvent and a surfactant. Subsequently, the resultant residue is subjected to, for example, hot-air drying, vacuum drying, or freeze drying, to thereby remove the solvent deposited onto the carbon fiber. By varying the drying temperature in removing solvent, among functional groups present on the surface of the carbon fiber, those of interest can be caused to remain thereon.

In addition, the amount and type of the functional group to be introduced on the surface of the carbon fiber can be regulated by treatment employing, for example, hydrochloric acid, nitric acid, or sulfuric acid, or activation treatment employing steam, carbon dioxide gas, or an alkali such as KOH or NaOH.

In the fine carbon fiber thus produced, each filament has a diameter of 2 to 500 nm and an aspect ratio of 1 to 100, and filaments, which each has a cut portion on its surface along the hollow space inside, account for 5 mass % to 80 mass % on the basis of the entirety of the carbon fiber.

Also, in the fine carbon fiber thus produced, the distribution of the lengths of fiber filaments is narrow with the variation in the lengths being small, and the standard deviation (μm) is 2.0 or less, preferably 1.0 or less, more preferably 0.5 or less, so that, when the carbon fiber is employed as an electrically or thermally conductive filler, the quality of the composite material can be kept high.

In order to enhance electrical conductivity of the thus-ground and dried fine carbon fiber, before or after grinding and drying, the fine carbon fiber may be subjected to heat treatment at 2,000 to 3,500° C. in an inert atmosphere to increase the graphitization degree of the carbon fiber. In order to further enhance electrical conductivity, the fine carbon fiber may be mixed with a boron compound such as boron carbide ($B_4C$), boron oxide ($B_2O_3$), elemental boron, boric acid ($H_3BO_3$), or a borate, and then subjected to heat treatment at 2,000 to 3,500° C. in an inert atmosphere.

Since thus-graphitized carbon fiber exhibits high crystallinity and enhanced mechanical strength, grinding the graphitized carbon fiber into carbon fiber having a length of interest requires a large amount of energy and a long time in comparison with non-graphitized carbon fiber.

No particular limitation is imposed on the amount of a boron compound added to the fine carbon fiber, since the amount varies in accordance with chemical properties and physical properties of the boron compound. For example, when boron carbide ($B_4C$) is employed, the amount of boron carbide is 0.05 to 10 mass %, preferably 0.1 to 5 mass %, on the basis of the entirety of the fine carbon fiber. Through heat treatment in the presence of the boron compound, the fine carbon fiber exhibits improved electrical conductivity, along with improved carbon crystallinity (interlayer distance $d_{002}$). Specifically, the average interlayer distance $d_{002}$ of (002) carbon layers measured by X-ray diffraction method is 0.342 nm or less when neither boron nor boron compound is added to the carbon fiber. When boron or a boron compound is added to the carbon fiber, the average interlayer distance ($d_{002}$) is 0.338 nm or less.

Any heat treatment furnace may be employed, so long as the furnace can maintain a predetermined temperature of at least 2,000° C., preferably at least 2,300° C. A typically employed furnace, such as an Acheson furnace, a resistance furnace, or a high-frequency furnace, may be employed. In some cases, carbon powder or carbon fiber may be heated through direct application of electricity.

Heat treatment is carried out in a non-oxidative atmosphere, preferably in an atmosphere of one or more rare gasses such as argon, helium, and neon. From the viewpoint of productivity, heat treatment is preferably carried out within a short period of time. When carbon fiber is heated over a long period of time, the carbon fiber is sintered to form aggregate, resulting in low production yield. After the center of carbon fiber block is heated to a target temperature, the carbon fiber block is not necessarily maintained at the temperature for more than one hour.

When carbon fiber is subjected to heat treatment, a portion of the carbon fiber is sintered to thereby form a sintered aggregate, as in the case of a typical carbon fiber product. Since the resultant sintered aggregate of carbon fiber cannot be added to electrodes, etc. or employed as an electron emission material, the aggregate must be subjected to crushing, to thereby obtain fine carbon fiber suitable for use as a filler material.

Therefore, the resultant block is subjected to crushing, pulverization, and classification, to thereby obtain fine carbon fiber suitable for use as a filler material. Simultaneously, separation of a non-fibrous product is carried out. When the block is insufficiently pulverized, the resultant carbon fiber fails to be mixed with an electrode material satisfactorily, and thus the effect of the carbon fiber is not obtained.

In order to obtain fine carbon fiber suitable for use as a filler, firstly, carbon fiber block formed through heat treatment is crushed into pieces having a size of 2 mm or less, and then pulverized by use of a pulverization apparatus. Examples of the crushing apparatus which may be employed include a typical ice crusher and a rotoplex.

Examples of the pulverization apparatus which may be employed include impact-type pulverization apparatuses such as a pulverizer and a ball mill; autogeneous grinding apparatuses; and pulverization apparatuses such as a micro jet. Separation of a non-fibrous product may be carried out through, for example, air classification.

The fine carbon fiber of the present invention may be incorporated into a battery electrode, to thereby improve properties such as charge/discharge capacity and strength of electrode in the resultant battery. Examples of the battery include batteries which require improved electrical conductivity of electrodes and which require performance of intercalation, such as a lithium battery, a lead storage battery, a polymer battery, and a dry battery.

By virtue of its high electrical conductivity, when the fine carbon fiber of the present invention is employed in such a battery, the electrical conductivity of the resultant battery can be enhanced. When the fine carbon fiber is employed in a lithium battery, the charge/discharge capacity of the battery can be increased, since the fine carbon fiber exhibits high intercalation performance as a carbon material for a negative electrode.

The amount of the fine carbon fiber incorporated as thus obtained into an electrode is preferably 0.1 mass % to 20 mass % inclusive. When the incorporation amount exceeds 20 mass %, the packing density of carbon in the electrode is lowered, thereby lowering the charge/discharge capacity of the resultant battery. In contrast, when the incorporation amount is less than 0.1 mass %, the effect of the fine carbon fiber is low.

When an electrode, for example, a negative electrode of a lithium battery containing the fine carbon fiber of the present invention, is formed, the fine carbon fiber and a binder are added to a carbonaceous material such as graphite powder or mesophase carbon micro beads (MCMB), and the resultant mixture is sufficiently kneaded such that the carbon fiber is dispersed in the mixture as uniformly as possible.

The fine carbon fiber of the present invention, as is, as mixed with other carbon fibers, or as a composite mixed with a matrix such as resin, ceramics and metals, may be put to various uses. When employed with a resin used as a matrix, the composite is adjusted so that the concentration of the fine carbon fiber of the present invention is 5 to 50 mass % based on the amount of the resin component. Examples of resin which may be used as matrix in the present invention include thermosetting resins such as phenol resin, epoxy resin, polyurethane resin, polyimide resin and unsaturated polyester resin; thermoplastic resins such as polyamide resin, polyurethane resin, vinyl chloride resin, acrylic resin and cellulose resin; and rubbers such as silicone rubber, polyurethane rubber, styrene butadiene rubber and natural rubber.

BEST MODE FOR CARRYING OUT THE INVENTION

The present invention will next be described in more detail by way of Examples, which should not be construed as limiting the invention thereto.

In order to calculate the amount of branched carbon fiber filament (mass %), a transmission electron micrograph (TEM) of a cross section of carbon fiber was used to calculate the ratio of the cross-sectional area of the branched carbon fiber to the total cross-sectional area of the carbon fiber, on the assumption that the branched carbon fiber and the carbon fiber have the same specific gravity.

In order to obtain the amount of boron (mass %), calcium carbonate was added to a powdery carbon fiber sample; the resultant mixture was formed into ash under an oxygen stream; calcium carbonate was added to the resultant ash; the thus-obtained mixture was melted under heating; the resultant molten product was dissolved in water; and the thus-prepared aqueous solution was subjected to quantitative analysis by means of ICP spectroscopy (Inductively coupled plasma atomic emission spectrometry method).

EXAMPLE 1

Vapor grown carbon fiber (2 g) having an average diameter of 25 nm, an average length of 10,000 nm, and an aspect ratio of 400 and containing branched vapor grown carbon fiber in an amount of 30 mass %, ethanol (50 g), and zirconia beads (diameter of each bead: 1.0 mm) (200 g) were placed in an agate-made planetary mill (capacity: 300 cm$^3$), and the carbon fiber was subjected to grinding treatment for four hours. Subsequently, the thus-ground carbon fiber was dried at 150° C. for three hours. Thereafter, the resultant vapor grown carbon fiber was observed under a scanning electron microscope, and the lengths of fiber filaments of the carbon fiber were measured. In addition, the carbon fiber sample was subjected to infrared analysis.

Figure 1:
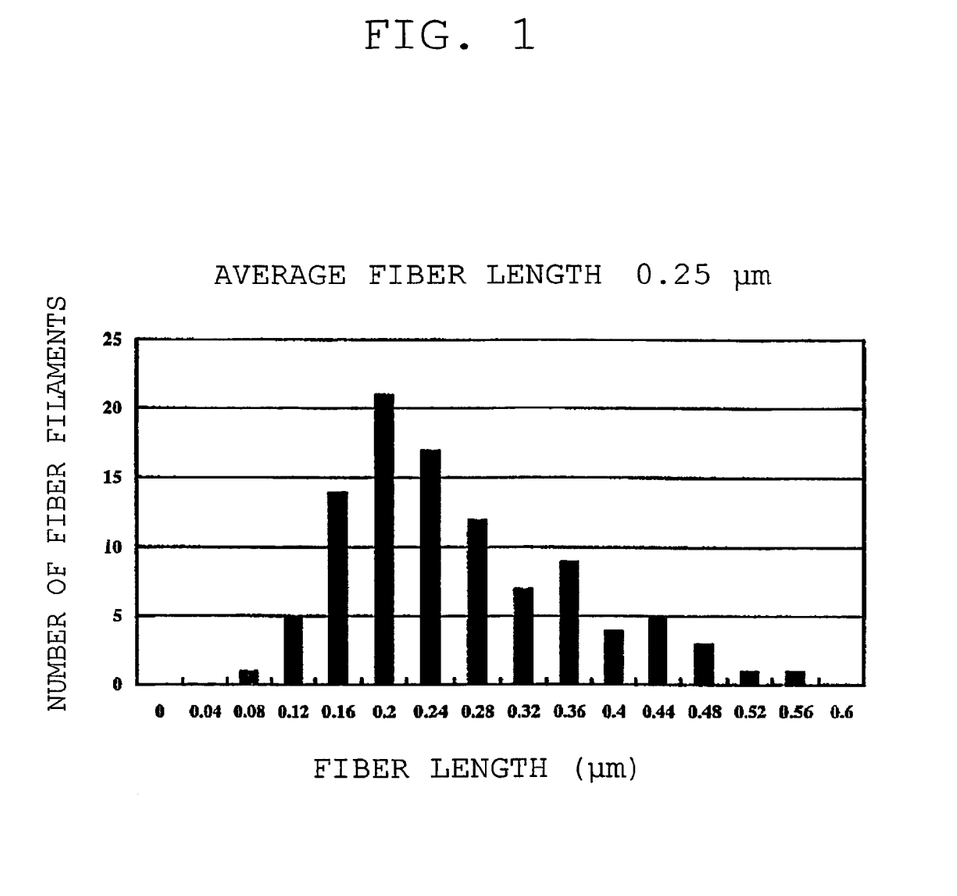
FIG. 1 shows the distribution of the lengths of fiber filaments of the fine carbon fiber of Example 1.

As a result, a fine carbon fiber having an average diameter of 25 nm, an average length of 250 nm, an aspect ratio of 10 and $d_{002}$ of 0.340 nm, was produced through the above grinding. The above-ground carbon fiber was observed under a scanning electron microscope, micrographs of the carbon fiber were taken, and the lengths of 100 fiber filaments of the carbon fiber were measured by use of a vernier caliper, to thereby obtain the distribution of the lengths. The results are shown in FIG. 1. In this case, the standard deviation was found to be 0.10 μm (100 nm). In infrared analysis, absorption of light attributed to stretching vibration of a hydroxyl group was observed at 3,600 cm$^{-1}$.

EXAMPLE 2

Vapor grown carbon fiber (2 g) which had undergone graphitization treatment in the presence of a boron compound, the carbon fiber having an average diameter of 33 nm, an average length of 16,500 nm, and an aspect ratio of 500 and containing branched vapor grown carbon fiber in an amount of 30 mass %, ethanol (50 g), and zirconia beads (diameter of each bead: 1.0 mm) (200 g) were placed in an agate-made planetary mill (capacity: 300 cm$^3$), and the carbon fiber was subjected to grinding treatment for four hours. Subsequently, the thus-ground carbon fiber was dried at 150° C. for three hours. Thereafter, the resultant vapor grown carbon fiber was observed under a scanning electron microscope, and the lengths of fiber filaments of the carbon fiber were measured. In addition, the carbon fiber sample was subjected to infrared analysis. The boron content of the carbon fiber sample was found to be 0.7 mass %.

Figure 2:
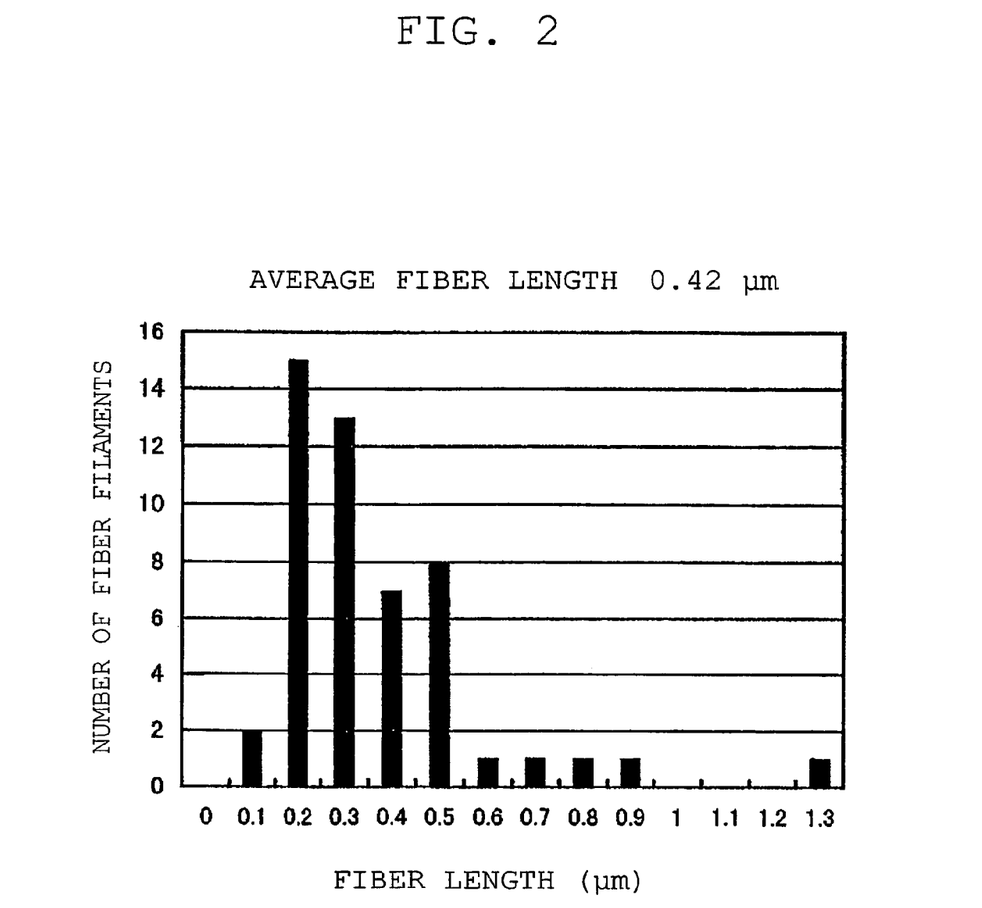
FIG. 2 shows the distribution of the lengths of fiber filaments of the fine carbon fiber of Example 2.

As a result, a fine carbon fiber having an average diameter of 33 nm, an average length of 420 nm, an aspect ratio of 13 and $d_{002}$ of 0.337 nm, was produced through the above grinding. The above-ground carbon fiber was observed under a scanning electron microscope, micrographs of the carbon fiber were taken, and the lengths of 50 fiber filaments of the carbon fiber were measured by use of a vernier caliper, to thereby obtain the distribution of the lengths. The results are shown in FIG. 2. In this case, the standard deviation was found to be 0.22 μm (220 nm). In infrared analysis, absorption of light attributed to stretching vibration of a hydroxyl group was observed at 3,600 cm$^{-1}$.

COMPARATIVE EXAMPLE 1

Vapor grown carbon fiber (90 g) which had undergone graphitization treatment, the carbon fiber having an average diameter of 33 nm, an average length of 16,500 nm, and an aspect ratio of 500 and containing branched vapor grown carbon fiber in an amount of 30 mass %, was placed in an alumina-made ball mill (capacity: 2,000 cm$^3$), and the carbon fiber was subjected to grinding treatment at 75 rpm for 18 hours. In this case, 30 alumina balls (diameter of each ball: 30 mm) were placed in the ball mill for grinding of the carbon fiber. Thereafter, the resultant vapor grown carbon fiber was observed under a scanning electron microscope, and the lengths of fiber filaments of the carbon fiber were measured. In addition, the carbon fiber sample was subjected to infrared analysis.

Figure 3:
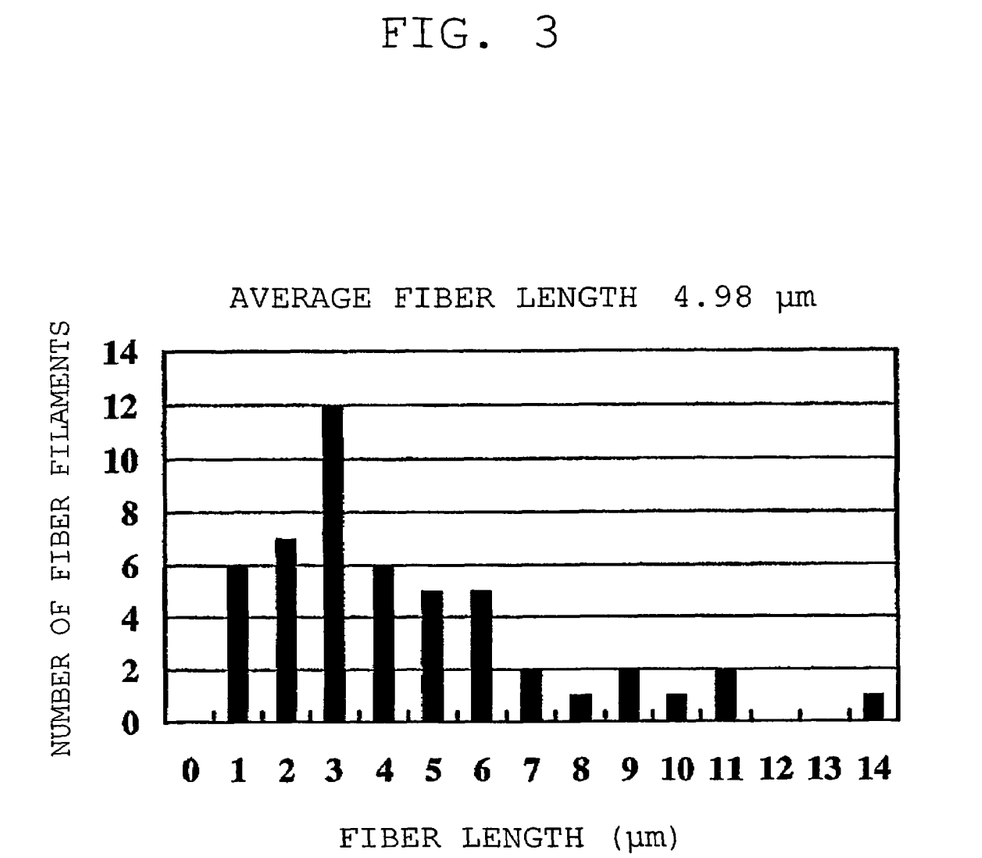
FIG. 3 shows the distribution of the lengths of fiber filaments of the fine carbon fiber of Comparative Example 1.

As a result, a carbon fiber having an average diameter of 33 nm, an average length of 4,980 nm, and an aspect ratio of 150 was produced. The above-ground carbon fiber was observed under a scanning electron microscope, micrographs of the carbon fiber were taken, and the lengths of 50 fiber filaments of the carbon fiber were measured by use of a vernier caliper, to thereby obtain the distribution of the lengths. The distribution of the fiber filament lengths is shown in FIG. 3. The standard deviation was found to be 3.07 µm (3,070 nm). In infrared analysis, virtually no absorption of light attributed to stretching vibration of a hydroxyl group was observed.

EXAMPLE 3

Each of the fired fine carbon fiber of Example 1 which had undergone wet grinding, the graphitized fine carbon fiber of Example 2 which had undergone wet grinding, and the graphitized carbon fiber of Comparative Example 1 which had undergone dry grinding was mixed with a phenol resin in an amount of 40 mass %, and the viscosity (cP or mPa·s) of the resultant mixture was measured at 25° C. by use of a viscometer through a method as specified by JIS K7117. The results are shown in Table 1.

TABLE 1

| Sample | Viscosity (cP) |
| --- | --- |
| Fired fine carbon fiber produced through wet grinding (Example 1): phenol resin = 40 mass %: 60 mass % | 30 |
| Graphitized fine carbon fiber produced through wet grinding (Example 2): phenol resin = 40 mass %: 60 mass % | 50 |
| Graphitized fine carbon fiber produced through dry grinding (Comparative Example 1): phenol resin = 40 mass %: 60 mass % | 150 |

The viscosity of a compound prepared through mixing a phenol resin with the fine carbon fiber produced through wet grinding (Example 1 or 2) is ⅓ or less the viscosity of a compound prepared through mixing a phenol resin with the fine carbon fiber produced through dry grinding (Comparative Example 1). That is, the compound prepared from the fine carbon fiber of Example 1 or 2 exhibits improved handling.

INDUSTRIAL APPLICABILITY (1) The carbon fiber of the present invention exhibits excellent workability when mixed with a matrix formed of, for example, resin, the carbon fiber is sufficiently dispersed in the resin, and the surface smoothness of the resultant composite material is improved.

(2) Since each fiber filament of the carbon fiber of the present invention has a minute depression and a hollow space to readily cause addition reactions with hydrogen and methane, the carbon fiber is suitable as a material for sorption of a gas such as hydrogen or methane.

(3) In the fine carbon fiber produced through the method of the present invention, the distribution of the lengths of fiber filaments is narrow, and variation in the lengths is small. Therefore, when the fine carbon fiber is employed as an electrically or thermally conductive filler, the quality of the resultant composite material can be enhanced.

The invention claimed is:

1. A vapor grown fine carbon fiber containing branched vapor-grown carbon fiber filaments, each fiber filament of the carbon fiber comprising, in its interior, a hollow space extending along the fiber filament, and having a multi-layer structure, an outer diameter of 2 to 500 nm, and an aspect ratio of 1 to 100, wherein the fiber filament comprises a cut portion on its surface along the hollow space, and the standard deviation in the distribution of the length of the fiber filaments is 2.0 µm or less.

2. The fine carbon fiber as claimed in claim 1, wherein the cut portion on the surface of the fiber filament comprises a minute depression.

3. The fine carbon fiber as claimed in claim 2, wherein the minute depression is in communication with the hollow space in the interior of the fiber filament.

4. The fine carbon fiber as claimed in any one of claims 1 through 3, wherein the fiber filament has a functional group on a surface thereof.

5. The fine carbon fiber as claimed in claim 4, wherein the functional group is at least one species selected from the group consisting of a hydroxyl group, a phenolic hydroxyl group, a carboxyl group, an amino group, a quinonyl group, and a lactone group.

6. The fine carbon fiber as claimed in claim 1, wherein the hollow space is partially closed.

7. The fine carbon fiber as claimed in claim 1, wherein the carbon fiber comprises carbon having an average interlayer distance $d_{002}$ of (002) carbon layers measured by X-ray diffraction method of 0.342 nm or less.

8. The fine carbon fiber as claimed in claim 1, which further comprises boron or a boron compound.

9. The fine carbon fiber as claimed in claim 8, wherein boron is contained, in an amount of 0.01 to 5 mass %, in carbon crystals constituting the carbon fiber.

10. A fine carbon fiber mixture comprising a fine carbon fiber as recited in claim 1 in an amount of 5 mass % to 80 mass % on the basis of the entirety of the carbon fiber mixture.

11. A fine carbon fiber composition comprising a fine carbon fiber as recited in claim 1.

12. The fine carbon fiber composition as claimed in claim 11, comprising a resin.

13. An electrically conductive material comprising a fine carbon fiber as recited in claim 1.

14. A secondary battery comprising, as an electrode material, a fine carbon fiber as recited in claim 1.

15. A gas occlusion material comprising a fine carbon fiber as recited in claim 1.

16. A method for producing a fine carbon fiber, comprising a step of subjecting a vapor grown carbon fiber containing branched vapor grown carbon fiber filaments each fiber filament of the carbon fiber comprising, in its interior, a hollow space extending along the fiber filament, and having a multi-layer structure, an outer diameter of 2 to 500 nm, and an aspect ratio of at least 10, to heat treatment and then wet-grinding the vapor-grown carbon fiber in the presence of water and/or an organic solvent so as to generate a cut portion on the fiber filament surface along the hollow space.

17. The method for producing a fine carbon fiber as claimed in claim 16, wherein the wet-grinding is performed in the presence of a surfactant.

18. The method for producing a fine carbon fiber as claimed in claim 16, wherein the vapor-grown carbon fiber is contained at 1 to 30 mass % in water or/and organic solvent.

19. A method for producing a fine carbon fiber, comprising, a step of obtaining the fine carbon fiber according to claim 16, and then subjecting the fiber, to which boron or a boron compound is added or not added, to heat treatment at a temperature of 2,000° C. to 3,500° C.

20. A fine carbon fiber produced through a production method as recited in any one of claims 16 through 19.

* * * * *